United States Patent [19]

Berrier et al.

[11] Patent Number: 5,550,005
[45] Date of Patent: * Aug. 27, 1996

[54] PHOTOSENSITIVE ELASTOMER POLYMER COMPOSITIONS FOR FLEXOGRAPHIC PRINTING PLATES

[75] Inventors: Arthur L. Berrier; Rustom S. Kanga, both of Ellicott City, Md.

[73] Assignee: W. R. Grace & Co.-Conn., New York, N.Y.

[ * ] Notice: The term of this patent shall not extend beyond the expiration date of Pat. No. 5,304,458.

[21] Appl. No.: 941,508

[22] Filed: Sep. 8, 1992

Related U.S. Application Data

[63] Continuation-in-part of Ser. No. 868,062, Apr. 13, 1992, Pat. No. 5,290,662, which is a continuation-in-part of Ser. No. 729,976, Jul. 15, 1991, Pat. No. 5,223,375.

[51] Int. Cl.$^6$ ............................ G03F 7/38; G03C 1/73
[52] U.S. Cl. ........................ 430/286.1; 430/281.1; 430/306; 522/114
[58] Field of Search .............................. 430/281, 285, 430/286, 287, 300, 306, 281.1, 285.1, 286.1, 287.1; 522/114, 120, 121

[56] References Cited

U.S. PATENT DOCUMENTS

| | | | |
|---|---|---|---|
| 3,639,523 | 2/1972 | Hayter | 260/880 |
| 4,045,231 | 8/1977 | Toda et al. | 430/306 |
| 4,162,919 | 7/1979 | Richter et al. | 430/281 |
| 5,223,375 | 6/1993 | Berrier et al. | 430/286 |
| 5,290,662 | 3/1994 | Berrier et al. | 430/286 |
| 5,304,458 | 4/1994 | Berrier et al. | 430/286 |

FOREIGN PATENT DOCUMENTS

| | | |
|---|---|---|
| 91116973.8 | 4/1992 | European Pat. Off. . |
| 52-38441 | 9/1977 | Japan . |

OTHER PUBLICATIONS

Jacovic, M. S., "Ionomer–Like Materials Based on 4–Vinyl–Pyridine Copolymers", Makromol Chem, Rapid Commun, 10, 217–225 (1989).

Soum et al "Synthesis and Characterization of New Block Copolymers of Butadiene and 2–Isopropenylpyridine", Polymer, 29, 1528–1534 (Aug. 1988).

*Primary Examiner*—Janis L. Dote
*Attorney, Agent, or Firm*—Woodcock Washburn Kurtz Mackiewicz & Norris

[57] ABSTRACT

Flexographic photosensitive printing plates are made with formulations comprising triblock polymers of poly(vinylpyridine)-poly(butadiene) or poly(isoprene)-poly(vinylpyridine). A variation in the formulations includes the insertion of a copolymerizable monomer such as styrene between the poly(butadiene) and poly(vinylpyridine) blocks. The polymers may be quaternized or neutralized with an organic acid. When made with quaternized polymers, the plates after imaging with UV may be developed in aqueous solutions. The acid neutralized polymers offer further advantages as to ease of synthesis, safety and improved resolution.

3 Claims, No Drawings

PHOTOSENSITIVE ELASTOMER POLYMER COMPOSITIONS FOR FLEXOGRAPHIC PRINTING PLATES

This application is a continuation-in-part of our application Ser. No. 868,062 filed Apr. 13, 1992, now U.S. Pat. No. 5,290,662 which is a continuation-in-part of U.S. Ser. No. 729,976 filed Jul. 15, 1991, now U.S. Pat. No. 5,223,375 for "Photosensitive Elastomer Polymer Compositions for Flexographic Printing Plates", both of which are incorporated herein by reference in their entirety.

FIELD OF THE INVENTION

This invention relates to radiation curable polymer formulations, as well as photosensitive articles having solid surfaces or layers prepared from such formulations. The invention also relates to a new class of compounds useful in making such formulations.

BACKGROUND OF THE INVENTION

Triblock copolymers having poly(4-vinylpyridine) end blocks and a polybutadiene center block can be prepared by sequential anionic polymerization of butadiene and of 4-vinylpyridine using an organolithium initiator; see M. S. Jacovic, "Ionomer-like materials based on 4-vinylpyridine copolymers," Maromol. Chem., Rapid Commun, vol. 10, 217–225 (1989).

Quaternization of triblock polymers of polystyrene-polybutadiene-polyvinylpyridine is disclosed by Ohnuma et al. in Chemical Abstracts, 111(16):134883 (1989).

Quaternization of poly(4-vinylpyridine) is known: Boucher et al., "Kinetics and Mechanism of the Quaternization of Poly(4-vinylpyridine) with Ethyl, n-Propyl, n-Butyl, n-Hexyl and Benzyl Bromide in Sulfolane", J. Chem. Soc. Faraday Trans. I, 73., pp. 1629–1635 (1977).

Diblock and triblock copolymers of butadiene and 2-isopropenylpyridine have been synthesized by anionic polymerization, using a difunctional lithium initiator: Soum et al., "Synthesis and Characterization of New Block Copolymers of Butadiene and 2-isopropenylpyridine," Polymer, vol. 29, pp. 1528–1534 (August, 1988).

U.S. Pat. No. 3,639,523 issued to Hayhr et al. Feb. 1, 1972 relates to adhesives having improved green strength, building tack, solvent resistance and high temperature stability. The architecture of the disclosed polymer is A-C-B-C-A where A is vinylpyridine, B is a conjugated diene, and C is a monovinyl arene. This reference does not disclose or suggest that this material can be used as a flexographic printing plate.

Triblock copolymers of polystyrene-polybutadiene (or polyisoprene)-polystyrene have been used in the preparation of photosensitive printing plates: U.S. Pat. No. 4,323,637, Chen et al., "Use of Cover Sheet and Interposed Flexible Film with Block Copolymer Compositions" (1982). The copolymers were not quaternized, nor were the resulting formulations water-developable.

U.S. Pat. No. 4,045,231 et al. discloses triblock polymers of the type polystyrene-polybutadiene-polystyrene for use in printing plates, but the polymers were not quaternized. Such plates are not water-developable.

U.S. Pat. No. 4,162,919, Richter et al. (1979), discloses a 2-block copolymer of styrene-isoprene (or butadiene) for use in flexographic printing plates.

U.S. Pat. No. 4,245,027, Takeda et al. (1981), discloses a photosensitive composition comprising copolymers of vinylpyridine and a polyvinylidene halide, optionally with an olefin, e.g., butadiene or isoprene, plus a light sensitizing element, e.g., iodoform, quinones, or diazonium salts, capable of forming a quaternary salt with the polyvinylpyridine on heating or on exposure to actinic light. The instant invention differs, inter alia, in that our triblock copolymer has no polyvinylidene component, and further in that when we quaternize it is prior to formulation and exposure.

U.S. Pat. Nos. 4,271,259 and 4,272,610, both to Breslow et al. (1981), disclose a copolymer of butadiene or isoprene with vinyl pyridine as a component in a photosensitive composition. The copolymer is not specified as ABA, and it is not quaternized. The composition requires an oxidizable component containing allylic hydrogen and a photooxygenation sensitizer.

U.S. Pat. No. 4,430,417, Heinz et al. (1984), discloses ABA triblock copolymers in making flexographic printing plates. A is styrene-butadiene, B is isoprene.

U.S. Pat. No. 4,179,531, Heinz (1979), discloses ABA triblock copolymers ("Kraton"$^{(R)}$—Shell Chemical Co.) in making printing plates where A is a styrene and B is a diene such as isoprene or butadiene. A polythiol is required in the formulation.

U.S. Pat. No. 4,045,231, Toda et al. (1977), discloses a styrene-butadiene-styrene triblock copolymer in a printing plate formulation.

Chem. Abstracts 111(6):39978k, Moeller et al., discloses iodine doped AB diblock copolymers of poly(2-vinylpyridine) and either polybutadiene or polystyrene.

Chem. Abstracts 109(10):74182b, Shimazaki et al., discloses triblock copolymer, polystyrene-polyisoprene-poly(vinylpyridine) quaternized with chloromethylstyrene. Use in photosensitive compositions is not disclosed.

Chem. Abstracts 104(20):169705k, Y. Mihaki, discloses isoprene-styrene-4-vinylbenzyldimethylamine block copolymers treated with di-iodopropane to prepare an amphoteric ion exchanger.

Chem. Abstracts 103(20):166031f, Lelah et al., discloses quaternization of triblock poly(styrene-butadiene- 4-vinylpyridine), with crosslinking of the butadiene segment and sulfonation of the styrene block.

Chem. Abstracts 101(6):39114u, Kudose et al., discloses quaternizing triblock butadiene-styrene-4-vinylpyridine copolymer with methyl bromide.

Chem. Abstracts 88(2):75242, Fielding-Russell et al., discloses HCl quaternization of butadiene-styrene- 2-vinylpyridine block copolymer.

European Patent application 91116973.8 published Apr. 15, 1992 discloses various symmetrical and asymmetrical block copolymers made of styrene, isoprene and methylactylic acid for use in elastic relief printing plates.

SUMMARY OF THE INVENTION

It is an object of the invention to prepare flexographic printing plates using formulations comprising triblock polymers of the type ABA or A'BA' where A is an unquaternized poly(vinylpyridine) consisting of repeating segments of the structure

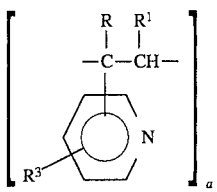

It is also an object of the invention to prepare a new class of compounds, viz., quaternized triblock polymers of the structure A'BA', where:

A' is a quaternized poly(vinylpyridine) consisting of repeating segments of the structure

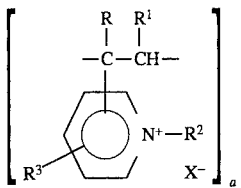

B is a poly(alkadiene) consisting of repeating segments of the structure

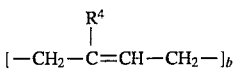

X is a leaving group;

R, $R^1$, $R^3$ and $R^4$ are independently H or 1–8 carbon-alkyl;

$R^2$ is H, 1–8 carbon alkyl, or aralkyl;

a has a value in the range of about 50–1,000;

b has a value in the range of about 500–10,000.

In the alternative, A' may be reacted with organic acids such as alkyl sulfonic acid, substituted acetic acid, substituted benzoic acid, or substituted benzene or aryl sulfonic acid and inorganic acids such as hydrochloric acid, sulfuric acid, phosphoric acid, etc. The preferred organic acids are trifluoroacetic acid, p-toluene sulfonic acid and o-nitrobenzoic acid. The preferred inorganic acids are hydrochloric acid and sulfuric acid.

It is a further object of this invention to make a symmetrical multiblock copolymer of the structure ACBCA and A'CBCA' where C is a second copolymerizable monomer. Such copolymerizable monomers include substituted or unsubstituted styrenes, which are well known in the art. They have the structure

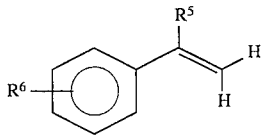

where $R^5$ and $R^6$ are independently H or 1–8 carbon alkyl. Other copolymerizable monomers include substituted or unsubstituted acrylates and methacrylates ("(meth)acrylates") which are well known in the art. They have the structure

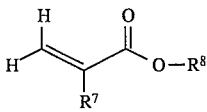

where $R^7$ is H or $C_1$-$C_8$ carbon alkyl and $R^8$ is $C_1$-$C_8$ alkyl. Of the copolymerizable monomers, unsubstituted styrene is preferred.

It is yet a further object of the invention to prepare a photosensitive flexographic printing plate using the aforesaid ABA, ACBCA, A'BA' and A'CBCA' polymers.

It is also an object to prepare a water-developable printing plate.

Another object is to prepare a thermoplastic elastomeric block polymer designed with a hydrophilic terminal block and which has good physical properties and water dispersibility.

Another object is to provide a more efficient reaction to make a thermoplastic elastomeric block polymer, and also one that uses less toxic chemicals.

Yet another object of this invention is to provide a clear, colorless thermoplastic elastomeric block polymer useful for making flexographic printing plates.

A further object is to provide a triblock polymer or prepolymer with an internal block which is a polymer of high enough molecular weight to provide elastomeric behavior, and where the terminal blocks provide water washability to the resultant triblock polymer.

The term "leaving group" is used in the conventional sense, e.g., as explained in Morrison and Boyd, Organic Chemistry, Third Ed., published by Allyn and Bacon, Inc., p. 456 (1973). As there described, alkyl halides typically react readily in nucleophilic substitutions, e.g., "R:X+:Z⁻→R:Z+ :X⁻ where :Z is a nucleophilic reagent (such as vinyl pyridine), R:Z is (in such case) quaternized vinylpyridine, and X is the leaving group. Although in the instant publication X is typically halide (F, Cl, Br, I), $R^2X$ can be any compound containing a leaving group, e.g. $R^2$-methane sulfonate; $R^2$-trifluoroacetate; $R^2$-trifluoromethane sulfonate; and the like.

Molecular weights are number average and are determined by comparison with a polyisoprene standard of known $M_n$ by the gel permeation chromatography technique.

DETAILED DESCRIPTION OF THE INVENTION

The invention is directed to certain block polymers and their use in making photosensitive printing plates. In a preferred embodiment, the invention includes a novel class of block polymers and their use in making printing plates developable in water.

The novel compounds are quaternized polyvinylpyridine-polyalkadiene-polyvinylpyridine block copolymers of the structure A'BA' and A'CBCA' where A', B and C are as above defined.

One of ordinary skill in the art will readily appreciate that ABA and ACBCA polymers, as well as further variations such as ADCBCDA and ACDBDCA can be made and are limited only in that the monomers C and D must be copolymerizable with the neighboring monomers. For the sake of brevity, this class of polymers is referred to as "ABA" or "A'BA'" polymers or compounds, unless otherwise noted.

Both the ABA and A'BA' compounds can be formulated in a solvent with photosensitive unsaturated compounds (e.g., reactive monomers such as acrylates and photoinitiators), and the solution can be solvent cast on flexographic plate backings. Alternatively, solvent-free formulations using ABA or A'BA' polymers may be extruded as photosensitive films.

Reagents required in carrying out the invention are described below.

The ABA Triblock Polymers

The starting ABA triblock polymers that are quaternized by the invention process are in general well known, and can be prepared by known processes. Sequential addition polymerization using a lithium initiator is considered especially useful, as described by Jacovic and by Soum et al., op. cit. These triblock polymers have the structure ABA, where A and B are as above defined. Further symmetrical block copolymers can be made by sequential addition of another copolymerizable monomer to produce a polymer with an ACBCA structure. As noted above, these will also be referred to as "ABA"-type polymers, except where specifically noted. Additional details for their preparation are given below.

In a preferred embodiment A is a segment from poly(4-vinylpyridine) or from poly(2-vinylpyridine) and B a segment from polyisoprene or polybutadiene; a is about 70–475 and for isoprene b is about 1000–5000 and for butadiene b is about 1200–6000. In another preferred embodiment A is a segment from poly(2-vinylpyridine), C is a segment of a poly(styrene) or a poly((meth)acrylate), B is a segment from polyisoprene or polybutadiene, a is 50 to 5,000, b is 500 to 10,000, c is 25–500.

Vinylpyridine is available in various position isomers and with varied substituents. Substantially all are useful in preparing the invention polymers.

The Quaternizing Compound $R^2X$

A variety of quaternizing materials is available for quaternizing the pyridine nitrogen, including the 1–8 carbon alkyl halides, e.g., methyl iodide, methyl bromide, ethyl chloride and the like; and aralkyl halides, e.g., benzyl bromide, benzyl chloride, and the like. Alkyl or aralkyl sulfonates are useful. Substantially any conventional quaternizing compound is considered workable in the invention. Alkylating agents are generally effective. Broadly speaking, compounds $R^2X$ where X is a leaving group are operable. See "Summary of the Invention", above.

The Quaternization Process

Quaternization proceeds conventionally, using solvents, temperatures, reagent proportions, and reaction times similar to those used in typical quaternizations of the prior art.

Preferred conditions for the quaternization of reaction of the invention include:
Solvent: chloroform, toluene, methylene chloride, methanol, benzene, tetrahydrofuran, and ethylene chloride. The solvent is not critical. Substantially any solvent that dissolves the initial ABA polymer and dissolves or disperses the quaternized product A'BA' is suitable.
Proportions: Stoichiometric excess of quaternizing compound over triblock polymer.
Quaternization reaction time: about 1–24 hours.
Quaternization reaction temperature: about 0°–60° C.

Following quaternization, the solvent may be stripped under reduced pressure to yield solvent-free product, or, if desired, the solution may be used directly in preparing the printing plate formulation.

In the alternative, A' may be reacted with an acid having a pka of <3.0. This reaction, or "neutralization", is different from quaternization in the sense that the nitrogen on the pyridine ring assumes a positive charge by bond formation with a proton rather than an alkyl group. The end result is the same as for quaternization, i.e., formation of a hydrophilic cationomer.

There are several advantages to using the acid neutralization route as opposed to quaternization.

The reaction with selected acids is comparatively quick and efficient. The acid reaction is complete in about 1 hour at room temperature. Reaction times for the vinyl pyridine copolymers with alkyl halides can be 24 hours or more or may require heating (about 40° C.) in order to obtain complete quaternization of the pyridine nitrogen.

The acid reacted polymer system is colorless. Quaternization with methyl iodide results in colored systems, presumably due to iodide generation.

The acid reaction synthesis conditions are more convenient. Quaternization with methylbromide has to be carried out in a closed pressure system due to the low boiling point of methyl bromide.

The acid reaction synthesis process is safer and more ecologically sound. All the alkyl halides are toxic chemicals which must be handled with care.

The polymer systems resulting from the acid reaction are clear. Films made with the quaternized polymers tend to be hazy or opaque. This can lead to incomplete cure in films and a reduced capacity for detail in the ultimate printing plate.

Since vinyl pyridines are weak bases (pka 3.5 to 4.0) it is preferable to employ acids which are fairly strong, i.e., pka <3.0. The following organic acids could be advantageously employed:
1. Alkyl sulfonic acids, such as methyl sulfonic acid, tri-fluoromethane sulfonic acid, 2,2,2 trifluoro ethane sulfonic acid.
2. Substituted acetic acids, such as mono- and di- or tri-fluoroacetic acid.
3. Benzoic acid and mono- and di-substituted benzoic acids particularly those having electron donating groups, including but not limited to fluoromethyl- and trifluoromethyl- as well as nitro-benzoic acids. Ortho-substituted forms are preferred over meta and para forms.

The preferred organic acids are trifluoroacetic acid ("TFA") p-toluenesulfonic acid ("PTSA") and o-nitrobenzoic acid (NBA). The preferred inorganic acids are hydrochloric acid and sulfuric acid. Other acids such as hydrofluoric, hydroiodic, nitric and perchloric acids, etc. can also be used.

Formulations

For use in printing plates, the invention employs two types of formulations. One type is for solvent casting and uses a solvent. The other is for extrusion and is solvent-free. For solvent casting, the block polymer, ABA or A'BA', is dissolved in a solvent for further processing. In the case of A'BA', it can be left in the same solvent in which it was neutralized or quaternized. To this solution is added a photosensitive unsaturated compound (typically an acrylate), and a photoinitiator. This solution can be solvent cast to produce a photopolymer plate, which can then be exposed and developed to produce solid printing plates. Development can be by water and/or solvent.

Thus, a formulation for solvent casting will include:

(1) Triblock polymer, ABA or A'BA', ACBCA or A'CBCA' or variations thereon;

(2) A solvent, including those solvents useful in the quaternizing process, e.g., methylene chloride, chloroform, toluene, methanol, benzene, tetrahydrofuran, ethylene chloride, etc.;

(3) A photosensitive unsaturated compound, as described below; and (4) A photoinitiator, as described below.

The Photosensitive Unsaturated Compound

This material is a reactive monomer, typically an acrylate. Useful acrylates include those of the formula:

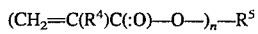

$$(CH_2=C(R^4)C(:O)-O-)_n-R^5$$

where $R^4$ is H or methyl and $R^5$ is an organic moiety having a valence of n, and n is 1 or more.

Such reactive monomers include, but are not limited to, trimethylolpropane triacrylate, hexanediol diacrylate, 1,3-butylene glycol diacrylate, diethylene glycol diacrylate, 1,6-hexanediol diacrylate, neopentyl glycol diacrylate, polyethylene glycol-200 diacrylate, tetraethylene glycol diacrylate, triethylene glycol diacrylate, pentaerythritol tetraacrylate, tripropylene glycol diacrylate, ethoxylated bisphenol-A diacrylate, trimethylolpropane triacrylate, dimethylolpropane tetraacrylate, triacrylate of tris(hydroxyethyl) isocyanurate, dipentaerythritol hydroxypentaacrylate, pentaerythritol triacrylate, ethoxylated trimethylolpropane triacrylate, triethylene glycol dimethacrylate, ethylene glycol dimethacrylate, tetraethylene glycol dimethacrylate, polyethylene glycol-200 dimethacrylate, 1,6-hexanediol dimethacrylate, neopentyl glycol dimethacrylate, polyethylene glycol-600 dimethacrylate, 1,3-butylene glycol dimethacrylate, ethoxylated bisphenol-A dimethacrylate, trimethylolpropane trimethacrylate, diethylene glycol dimethacrylate, 1,4-butanediol diacrylate, diethylene glycol dimethacrylate, pentaerythritol tetramethacrylate, glycerin dimethacrylate, trimethylolpropane dimethacrylate, pentaerythritol trimethacrylate, pentaerythritol dimethacrylate, pentaerythritol diacrylate, urethane-methacrylate or acrylate oligomers and the like which can be added to the photopolymerizable composition to modify the cured product. Monoacrylates such as cyclohexyl acrylate, isobornyl acrylate, lauryl acrylate and tetrahydrofurfuryl acrylate and the corresponding methacrylates are also operable as reactive diluents.

Photoinitiators

The formulations comprising the novel materials of this invention require a photoinitiator. A large number are available and useful.

Photoinitiators for the photocurable composition include the benzoin alkyl ethers, such as benzoin methyl ether, benzoin ethyl ether, benzoin isopropyl ether and benzoin isobutyl ether. Another class of photoinitiators are the dialkoxyacetophenones exemplified by 2,2-dimethoxy-2-phenylacetophenone, i.e., Irgacure® 651 (Ciba-Geigy); and 2,2-diethoxy-2-phenylacetophenone. Still another class of photoinitiators are the aldehyde and ketone carbonyl compounds having at least one aromatic nucleus attached directly to the carboxyl group. These photoinitiators include, but are not limited to, benzophenone, acetophenone, o-methoxybenzophenone, acenaphthenequinone, methyl ethyl ketone, valerophenone, hexanophenone, alpha-phenyl-butyrophenone, p-morpholinopropiophenone, dibenzosuberone, 4-morpholinobenzophenone,4'-morpholinodeoxybenzoin, p-diacetylbenzene, 4-aminobenzophenone, 4'-methoxyacetophenone, benzaldehyde, alpha-tetralone, 9-acetylphenanthrene, 2-acetylphenanthrene, 10-thioxanthenone, 3-acetylphenanthrene, 3-acetylindone, 9-fluorenone, 1-indanone, 1,3,5-triacetylbenzene, thioxanthen-9-one, xanthene-9-one, 7-H-benz[de]-anthracene-7-one, 1-naphthaldehyde, 4,4'-bis(dimethylamino)-benzophenone, fluorene-9-one, 1'-acetonaphthone, 2'-acetonaphthone, 2,3-butanedione, acetonaphthene, benz[a]anthracene 7.12 dione, etc. Phosphines such as triphenylphosphine and tri-o-tolylphosphine are also operable herein as photoinitiators.

Other Additives

Other additives to the photocurable composition can be included. To inhibit premature crosslinking during storage of the prepolymer containing compositions of this invention, thermal polymerization inhibitors and stabilizers are added. Such stabilizers are well known in the art, and include, but are not limited to, hydroquinone monobenzyl ether, methyl hydroquinone, amyl quinone, amyloxyhydroquinone, n-butylphenol, phenol, hydroquinone monopropyl ether, phenothiazine and nitrobenzene, and mixtures thereof. Such additives are used in an amount within the range of from about 0.01 to about 2% by weight of the prepolymer. These stabilizers are effective in preventing crosslinking of the prepolymer composition during preparation, processing and storage.

The compositions also may contain up to about 50% by weight of an inert particulate filler which is essentially transparent to actinic light. Such fillers include the organophilic silicas, bentonites, silica and powdered glass. Such fillers can impart desirable properties to the photocurable compositions and reliefs on printing plates containing those compositions.

Summarizing, formulations using the herein described polymers suitably include the following (in parts by weight):

(1) Block polymer, optionally quaternized, about 50–99, preferably about 75–95;

(2) Photosensitive unsaturated compound, about 0.1–50, preferably about 0.1–20;

(3) Photoinitiator, about 0.01–5.0, preferably about 0.1–3.0.

Additionally the formulation contains enough solvent to dissolve the above materials.

For extrusion, the solvent in omitted.

Preparation of Plate

The photocurable compositions comprising polymer ABA or A'BA' can be shaped and formed as a solid layer of suitable thickness according to conventional solvent casting, i.e., dissolving the composition in a solvent, shaping the solution into a film or plate, and removing the solvent, e.g., by oven-drying. Alternately, conventional extrusion calendaring or hot press techniques can be used. Solid layers of the photosensitive composition in the form of a film can be adhered to supports such as those comprising polyester, nylon, or polycarbonate. Other suitable supports include woven fabrics and mats, e.g., glass fiber fabrics or laminated materials made of, for example, glass fibers and plastics; and steel or aluminum coated plates. It is preferred that the supports be dimensionally stable and resistant to the washout solutions.

It may be desirable to protect the photosensitive surfaces from contamination by dirt and dust during storage before being exposed and washed. Such protection may be accomplished by application of a flexible protective cover sheet to the side of the photocurable composition opposite that of the support. In addition, the photocurable compositions can sometimes be tacky, and in such case it may be desirable to apply a release film to the surface of the photosensitive layer before application of the coversheet. The release film may consist of a thin, flexible, water-dispersible polymeric film placed in intimate contact on the surface of the photocurable composition. Such release films are well known in the art.

Exposure and Development

Photosensitive articles comprising a support having a solid layer or surface comprising the invention photocurable compositions, e.g., solid flexographic printing plates, can be processed by well known techniques for imagewise exposure to actinic light. Preferably, the light should have a wavelength of about 230–450 microns. Exposure is through a negative placed between the light source and the photosensitive surface. Suitable sources of light include Type RS sunlamps, carbon arc lamps, xenon arc lamps, mercury vapor lamps, tungsten halide lamps, and the like.

Exposure periods depend upon the intensity of the actinic light, thickness of the plate, and the depth of the relief desired on the printing plate. Exposure periods of from 2 to 20 minutes are generally suitable.

After exposure and removal of the negative, the unexposed areas of the photosensitive surface can be developed in washout solutions as herein described. As noted, a preferred washout solution for plates containing A'BA' polymer is a dilute aqueous surfactant solution. Plain water (preferably warm) is also useful (preferably with brushing). This feature is particularly advantageous in that it avoids problems of disposing of washout solutions containing organic solvents. Washout solvents recommended for developing ABA-type plates (i.e., using unquaternized copolymers) include toluene and tetrachloroethylene.

The following Examples illustrate without limiting the invention.

EXAMPLES 1–8

Preparation of ABA Block Copolymers

As noted above, materials and methods for the preparation of the ABA copolymers used in this invention are known. However, to facilitate an understanding of our techniques, we offer below the methods that we used to prepare the starting ABA triblock copolymers.

The poly(2-vinylpyridine)/polyisoprene and poly(4-vinylpyridine)/polyisoprene ABA block copolymers were prepared by the sequential addition of isoprene and vinylpyridine to a difunctional organolithium initiator in benzene. The benzene solvent was distilled prior to use from the sodium ketyl of benzophenone. Monomers were distilled from calcium hydride prior to use. The polymerizations were carried out in oven-dried round-bottom flasks under dry argon atmosphere.

The difunctional initiator was prepared by dissolving bis[4-(1-phenylvinyl)phenyl]ether or 1,3-diisopropenylbenzene in 500 ml of dry benzene and adding 2 equivalents of sec-butyllithium.

The isoprene midblock was prepared by the addition of isoprene to the difunctional organolithium initiator. The end blocks were prepared by the addition of 2- or 4-vinylpyridine to the living polyisoprenyl lithium dianion. The living polymer was terminated by the addition of degassed methanol (2 ml) and was precipitated by adding the polymer solution to a large excess of methanol. The reaction conditions used in the above steps for Examples 1–8 are given in Table 1.

A butadiene or other alkadiene midblock may be prepared in essentially the same way.

Referring to Table 1, "a" and "b" may be readily calculated from the data. Thus, in Example 8, to determine "b", "Mn" of the polyisoprene midblock was found to be 155,000 (GPC, polyisoprene standards). Dividing the "Mn" with the molecular weight of isoprene (68.12) gives 2275="b".

To determine "a", we can find the total weight of vinylpyridine incorporated into the block copolymer from the "wt % VP" (19.3%) and the weight of isoprene (30.65 g). This calculation gives 7.33 g. vinylpyridine in the sample which divided by the molecular weight (105.14 g/mole) gives moles of vinylpyridine (0.07). Moles of vinylpyridine divided by moles of the initiator ($7.01 \times 10^{-4}$ moles) gives 100 and since there are 2 endblocks we get 100×2=200 which is the value of "a". The total molecular weight is thus 155,000+2×100×105.14=176,000. These figures are approximate.

TABLE 1(1)

| Ex. | Vinyl Position | Inititator[2] Reaction Conditions | | Isoprene Reaction Conditions | | Vinylpyridine Reaction Conditions | | $M_n^3$ | MWD | Wt %[5] VP | Isoprene Microstructure[5], wt | |
|---|---|---|---|---|---|---|---|---|---|---|---|---|
| | | g. | °C./hr | g. | °C./hr | g. | °C./hr | | | | 1,4 | 3,4 |
| 1 | 4 | 0.1904 | 50/1 | 30.65 | 45/1.5 | 11.70 | 25/0.5 | 195 | 1.77 | 19.8 | 93.7 | 7.0 |
| 2 | 4 | 0.1887 | 50/1 | 30.65 | 45/3 | 12.3 | 5/0.5 | 217 | 1.47 | 28.3 | 92.7 | 7.3 |
| 3 | 4 | 0.2821 | 60/1.75 | 30.65 | 45/3 | 13.31 | 5/1 | 194 | 1.49 | 24.3 | 91.9 | 8.1 |
| 4 | 2 | 0.1889 | 65/1.75 | 27.24 | 45/3 | 13.11 | 5/1 | 343 | 1.37 | 29.5 | 93.0 | 7.0 |
| 5 | 2 | 0.2812 | 65/2 | 30.65 | 45/3 | 6.96 | 5/1 | 151 | 1.62 | 13.2 | 92.0 | 8.0 |
| 6 | 2 | 0.1891 | 65/2.5 | 30.65 | 45/2 | 12.18 | 5/1 | 218 | (4) | 20.6 | 93.0 | 7.0 |
| 7 | 2 | 0.2647 | 65/2 | 44.27 | 45/2 | 13.90 | 5/1 | 317 | 1.77 | 16.4 | 93.8 | 6.2 |
| 8 | 2 | 0.1110 | 65.2 | 30.65 | 50/2 | 9.94 | 5/0.5 | 176 | 1.35 | 19.3 | 92.0 | 8.0 |

Notes:
[1]500 ml dried benzene used as solvent in all Examples.
[2]Bis[(4-(1-phenylvinyl)phenyl]ether initiator used in Ex.'s. 1–7; 1,3-diisopropenylbenzene in Ex. 8.
[3]From GPC (polyisoprene standards) × 1000.
[4]Bimodal distribution.
[5]From $^1$H NMR analysis.
MWD = molecular weight distribution;
VP = polyvinylpyridine.

EXAMPLES 9–13

Quaternization of Polyvinylpyridine/Polyisoprene ABA Block Copolymers

The quaternization of the polyvinylpyridine/polyisoprene block copolymers was performed by dissolving the polymer in chloroform or toluene/methylethylketone and adding an excess of methyl bromide. The reaction conditions used for Examples 9–13 are given in Table 2. Quaternization of the pyridine ring was verified by IR spectroscopy.

TABLE 2

Quaternization of Polyvinylpyridine/Polyisoprene ABA Block Copolymers

| Ex. | Using Polymer of Ex. No. | Temperature °C. | TIme hrs | IR data $cm^{-1}$ |
|---|---|---|---|---|
| 9 | 2 | 0–25 | 14 | 1645 |
| 10 | 4 | 0–25 | 14 | 1630 |
| 11 | 5 | 0–25 | 14 | 1630 |
| 12 | 6 | 0–25 | 14 | 1630 |
| 13 | 8 | 40 | 20 | 1630 |

Notes:
(1) Solvent used in Examples 9–12 was toluene/methylethylketone, 3/1 by volume. Solvent in Example 13 was chloroform, and the reaction was conducted in a sealed glass reactor.
(2) For Examples 9–12, the reaction was started at 0° C. and over the course of the reaction, the temperature rose to room temperature, i.e. 25° C.

EXAMPLES 14–18

Formulation of ABA and A'BA' Block Copolymers

The ABA block copolymers or quaternized A'BA' block copolymers as the case may be were formulated with photoinitiator and (meth)acrylate monomers by adding Irgacure® 651 photoinitiator from Ciba-Geigy, hexanediol dimethacrylate and hexanediol diacrylate to a chloroform or toluene solution of the polymer. The composition of the resulting solutions (calculated on a weight percent, solvent-free basis) was 89% block polymer, 1% photoinitiator, 5% hexanediol dimethacrylate, and 5% hexanediol diacrylate. The solutions were then solvent cast onto a polyester film and dried. The dried films (not imaged, not developed) were cured by exposure to UV light and their mechanical properties evaluated. The results are listed in Table 3.

EXAMPLE 20

The quaternized poly(4-vinylpyridine)/polyisoprene A'BA' block copolymer of Example 9 was formulated as Example 15 and was solvent-cast to give a 60 mil thick solid photocurable film. This film was actinically exposed to UV light in an image-wise fashion and washed in an aqueous surfactant solution (Triton RW-150) at 120° F. to form a flexographic relief plate. The developed plate showed good reproduction of the negative film image. In the washing operation, a surfactant is not necessary, but is preferred because it speeds the developing process and gives a cleaner plate. Plain water will do.

EXAMPLES 21–27

Neutralization of Polyvinylpyridine/Polyisoprene ABA Block Copolymers and Their Formulations The block copolymers similar to the ones in Examples 1–8 were dissolved in a toluene-methanol (95:5 wt %) solvent mixture. A calculated amount of the strong acid was dissolved in methanol and added dropwise to the above polymer solution. Enough acid was utilized to neutralize 60 mol % of the vinylpyridine end blocks. Upon addition of the acid solution there was seen an immediate increase in the viscosity of the polymer solution. Table 4 summarizes the reaction conditions used. The reaction between the polymer and acid was allowed to proceed for 1 hour at R.T. and further formulated as before (Examples 14–18).

The physical properties and swell data of the acid neutralized block copolymers are listed in Table 5.

The advantages of using neutralization with strong acids over quaternization becomes quite apparent from Tables 4 and 5. The physical properties (tensile, modulus, Shore A°, etc.) were seen to be within the range and similar to the quaternized block copolymers. The physical properties, of course, depend on the total Mn and Wt % VP. The formulated neutralized block copolymers were non-hazy and clear. Thus incomplete through-cure was avoided, and the resolution of the imaged plate was improved. The acids used were either solids or high-boiling liquids and non-toxic. The reaction proceeded under relatively mild conditions (1 hour at room temperature) and did not require a closed pressure system.

TABLE 3

Physical Properties of Cured Films

| Ex. | Polymer of Ex. No. | Tensile (psi) | Elong. (%) | Mod. (psi) | Shore A (°) | Resilience (%) | Swell Resistance[1] | | | | |
|---|---|---|---|---|---|---|---|---|---|---|---|
| | | | | | | | $H_2O$ | IPA[2] | EtOH/EtAc[3] | Aq. Ink | Solvent Ink |
| 14 | 1 | 370 | 586 | 274 | 39 | 50 | 6 | 36 | 59 | 11 | 61 |
| 15 | 9 | 663 | 217 | 578 | 62 | 56 | 15 | 5 | 13 | 28 | 8 |
| 16 | 10 | 976 | 331 | 778 | 54 | 50 | 25 | 26 | 17 | 40 | 19 |
| 17 | 11 | 362 | 271 | 292 | 46 | 54 | 6 | 9 | 25 | 9 | 15 |
| 18 | 12 | 393 | 248 | 316 | 47 | 49 | 9 | 8 | 30 | 11 | 16 |

Notes: All polymers were quarternized except in Ex. 14.
Tensile strength (Tensile), Elongation (Elong.), and Tensile modulus (Mod.) (1% elongation) were determined by ASTM D 412.
Shore hardness was determined by ASTM D 2240.
[1]Swell Resistance determined by 24-hour weight gain of 20 mil thick sample.
[2]Isopropyl alcohol.
[3]85 wt % ethanol, 15 wt % ethyl acetate.

EXAMPLE 28

Preparation of ACBCA Block Copolymer

The poly(2-vinylpyridine-styrene-isoprene-styrene-2-vinylpyridine) ACBCA block copolymers were prepared by the sequential addition of isoprene, styrene and 2-vinylpyridine to a difunctional organolithium initiator in benzene.

The solvents and reagents were purified as follows. Benzene was distilled prior to use from a metallic sodium and benzophenone complex. The dark violet color indicated absence of protic and oxidative impurities. Isoprene was distilled under argon twice, once from calcium hydride and once from a dibutylmagnesium solution in heptane. Styrene was distilled twice under reduced pressure, once from calcium hydride and once more from dibutylmagnesium. 2-vinylpyridine was distilled twice from calcium hydride under reduced pressure.

The polymerizations were carried out in a dry round-bottom flask flushed thoroughly with argon. The flask was equipped with a magnetic stirring system, an argon inlet, a reflux condenser and a rubber septa. All additions were carried out using a two-ended needle under dry argon. Utmost care was taken to see that the polymerization environment was free from oxygen and moisture.

The difunctional initiator was prepared by dissolving 0.12 cc of 1,3-diisopropenylbenzene (0.111 g, 0.7 mmole) in 500 ml of benzene which has been degassed with oxygen-free argon for 45 minutes. The benzene solution was titrated with 1.3M secbutyllithium until a yellow color persisted (0.3 ml of 1.3M secbutyllithium was required for the end point). Two equivalents more (1.4 mmoles) of the secbutyllithium was syringed in. The reaction between the precursor and secbutyllithium was allowed to proceed at 70° C. for 2 hours at which time the solution was dark red. It was cooled to 35° C. and 5–10 g of degassed isoprene was syringed in. The initial "seeding" was allowed to proceed at 35° C. for 30 minutes after which the rest of the isoprene (35.53 g, 0.52 mole total) was syringed in. The solution was heated to 50° C. for 1½ hours, at which stage the color was light red. Since the viscosity was high, the magnetic stirring system was switched to a more powerful mechanical stirring system. An aliquot of the isopropenyllithium was syringed out and quenched in methanol. This sample of polyisoprene was used for determination of the molecular weight of the starting block. Styrene (2.39 g, 0.02 mole) was added to the above solution at 50° C. and allowed to stir at 50° C. for 1 hour. It was dark yellow or orange at this stage. The solution was further cooled to 8° C. and 2-vinylpyridine was syringed in (16.46 g, 0.156 moles). The solution turned dark red immediately. It was stirred at 8° C. for 30 minutes and terminated with 1–2 ml of degassed methanol. The polymer was characterized by $^1$H NMR and GPC as having a molecular weight of 500,000 and a molecular weight distribution of 1.25, and the polymer's composition was 69% isoprene, 7% styrene, and 24% 2-vinylpyridine. Physical characteristics are listed in Table 5.

TABLE 4

Reaction Conditions for the Neutralization[1] of Polyvinylpyridine/Polyisoprene ABA Block Copolymers

| Example | Endblock | Mn × $10^3$ | Wt % Endblock | Acid | Temperature °C. | Time Hrs | IR Data $CM^{-1}$ |
|---|---|---|---|---|---|---|---|
| 21 | 2 VP | 81 | 32 | TFA[2] | 25 | 1 | 1690, 1195 |
| 22 | 2 VP | 180 | 24 | TFA[2] | 25 | 1 | 1690, 1195 |
| 23 | 2 VP | 126 | 30 | TFA[2] | 25 | 1 | 1690, 1195 |
| 24 | 2 VP | 126 | 30 | TFA[2] | 25 | 1 | 1630, 1195, 1125 |
| 25 | 4 VP | 115 | 28 | TFA[2] | 25 | 1 | 1690, 1195 |
| 26 | 4 VP | 91 | 25 | TFA[2] | 25 | 1 | 1690, 1195 |
| 27 | 4 VP | 91 | 25 | TFA[2] | 25 | 1 | 1630, 1195, 1125 |
| 28 | 2 VP | 500 | 24 | HCL[3] | 25 | 1 | 1690, 1195 |

[1]60% Neutralized
[2]Trifluoroacetic Acid
[3]Hydrochloric Acid

TABLE 5

Physical Properties of 60% Neutralized Block Copolymers

| Polymer of Example No. | Elongation % | Tensile PSI | Modulus PSI | Shore Å | Resilience % | Swells % Aqueous Ink | Solvent Ink |
|---|---|---|---|---|---|---|---|
| 21 | 80 | 445 | 320 | 55 | 37 | 35 | 53 |
| 22 | 475 | 1100 | 350 | 57 | 51 | 25 | 32 |
| 23 | 288 | 456 | 212 | 39 | 41 | 38 | 50 |
| 24 | 306 | 1010 | 362 | 64 | 38 | 38 | 59 |
| 25 | 215 | 450 | 185 | 49 | 40 | 28 | 15 |
| 26 | 245 | 490 | 205 | 44 | 43 | 26 | 18 |
| 27 | 200 | 200 | 225 | 52 | 26 | 24 | 19 |
| 28 | 575 | 1021 | 472 | 51 | 58 | 32 | 45 |

What is claimed is:

1. A photosensitive article comprising a backing and a layer of a photosensitive composition on the backing comprising a quaternized multiblock copolymer of the structure A'CBCA' where A' is

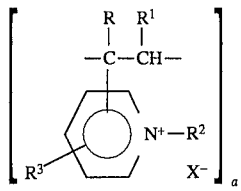

B is

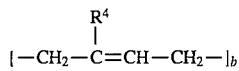

X is a leaving group;

R, $R^1$, $R^2$, and $R^4$ are independently H or 1–8 carbon alkyl;

$R^2$ is H, 1–8 carbon alkyl, or aralkyl;

C is a segment of a polymerized monomer having about 25–500 monomer units, said monomer being a substituted or unsubstituted styrene, a substituted or unsubstituted acrylate or a substituted or unsubstituted methacrylate;

a has a value in the range of about 50–1,000; and b has a value in the range of about 500–10,000; a photosensitive unsaturated compound; and a photoinitiator.

2. The photosensitive article of claim 1 wherein C is a segment of a polymerized monomer selected from the group consisting of substituted styrene and unsubstituted stryene.

3. The photosensitive article of claim 1, wherein A' is based on 2-vinylpyridine, B is based on isoprene and C is based on styrene.

* * * * *

UNITED STATES PATENT AND TRADEMARK OFFICE
CERTIFICATE OF CORRECTION

PATENT NO. : 5,550,005
DATED : August 27, 1996
INVENTOR(S) : Arthur L. Berrier, Rustom S. Kanga It is certified that error appears in the above-indentified patent and that said Letters Patent is hereby corrected as shown below:

On title page,
Item [73]    should read --Assignee: PT Sub, Inc., Wilmington, DE--

Signed and Sealed this

Sixth Day of May, 1997

Attest:

BRUCE LEHMAN

Attesting Officer

Commissioner of Patents and Trademarks